US009350685B2

(12) United States Patent
Torres

(10) Patent No.: US 9,350,685 B2
(45) Date of Patent: May 24, 2016

(54) NETWORK SWITCH CONNECTED TO A SENSOR

(75) Inventor: Matt A. Torres, Salem, OR (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 697 days.

(21) Appl. No.: 13/384,931

(22) PCT Filed: Oct. 29, 2009

(86) PCT No.: PCT/US2009/062634
§ 371 (c)(1),
(2), (4) Date: Jan. 19, 2012

(87) PCT Pub. No.: WO2011/053298
PCT Pub. Date: May 5, 2011

(65) Prior Publication Data
US 2012/0112734 A1    May 10, 2012

(51) Int. Cl.
G01N 27/00    (2006.01)
H04L 12/931   (2013.01)
G06Q 10/00    (2012.01)

(52) U.S. Cl.
CPC ............. H04L 49/40 (2013.01); G06Q 10/00 (2013.01); G06Q 2220/00 (2013.01); G06Q 2230/00 (2013.04)

(58) Field of Classification Search
CPC .............. G06Q 10/00; G06Q 2220/00; G06Q 2230/00; A47F 1/00; H01F 1/00
USPC ............... 324/71.1, 415, 421; 340/572.7; 343/741; 370/401
See application file for complete search history.

(56) References Cited

U.S. PATENT DOCUMENTS

| 5,712,621 | A  | * | 1/1998  | Andersen ............... 340/547 |
| 6,832,168 | B2 | * | 12/2004 | Graves et al. ............ 702/60 |
| 7,511,959 | B2 | * | 3/2009  | Belady et al. ............ 361/701 |
| 8,063,782 | B2 | * | 11/2011 | Miriyala et al. ........ 340/572.1 |
| 8,212,674 | B2 | * | 7/2012  | Howarth et al. ........ 340/572.1 |
| 8,533,601 | B2 | * | 9/2013  | LaForest ................ 715/736 |
| 2001/0025413 | A1 | * | 10/2001 | Asai et al. ............. 29/832 |
| 2002/0091944 | A1 | * | 7/2002  | Anderson et al. ........ 713/201 |
| 2004/0095928 | A1 | * | 5/2004  | O'Neill et al. .......... 370/389 |

(Continued)

FOREIGN PATENT DOCUMENTS

| CN | 2842587 Y   | 11/2006 |
| CN | 200950284 Y | 9/2007  |
| CN | 101140608 A | 3/2008  |

OTHER PUBLICATIONS

English Translation (machine-generated) of Abstract from Chinese Patent Publication No. 101140608A [retrieved on Feb. 5, 2014], Retrieved from the Internet: <http://worldwide.espacenet.com/publicationDetails/biblio?DB=worldwide.espacenet.com&II=0&ND=3&adjacent=true&locale=en_EP&FT=D&date=20080312&CC=CN&NR=101140608A&KC=A>.

(Continued)

Primary Examiner — Huy Q Phan
Assistant Examiner — Temilade Rhodes-Vivour
(74) Attorney, Agent, or Firm — Conley Rose, P.C.

(57) ABSTRACT

A system comprises a rack and a network switch contained in the rack. The switch comprises a plurality of ports. The system further comprises a movable access mechanism in the rack and a sensor. The sensor is provided on the rack and electrically connects to a port on the network switch. The sensor detects when the movable access mechanism is moved.

20 Claims, 3 Drawing Sheets

(56) References Cited

U.S. PATENT DOCUMENTS

| | | | |
|---|---|---|---|
| 2004/0163102 A1 | 8/2004 | Fowler et al. | |
| 2005/0004703 A1* | 1/2005 | Christie, Jr. | 700/214 |
| 2005/0217499 A1* | 10/2005 | Fisher | F24C 15/16 99/426 |
| 2006/0077888 A1* | 4/2006 | Karam | H01L 1/22 370/216 |
| 2006/0078093 A1* | 4/2006 | Karam | H04L 1/22 379/24 |
| 2006/0117089 A1* | 6/2006 | Karam | H04L 1/22 709/208 |
| 2006/0253633 A1* | 11/2006 | Brundridge | G06F 13/409 710/104 |
| 2007/0194002 A1* | 8/2007 | Fisher | F24C 15/16 219/400 |
| 2007/0222597 A1 | 9/2007 | Tourrilhes et al. | |
| 2008/0006508 A1* | 1/2008 | Nadeau et al. | 198/341.05 |
| 2008/0123288 A1 | 5/2008 | Hillis | |
| 2009/0259749 A1* | 10/2009 | Barrett | G06F 11/3495 709/224 |
| 2010/0114367 A1* | 5/2010 | Barrett et al. | 700/236 |
| 2010/0142544 A1* | 6/2010 | Chapel et al. | 370/401 |

OTHER PUBLICATIONS

English Translation (machine-generated) of Abstract from Chinese Patent Publication No. 2842587Y [retrieved on Feb. 5, 2014], Retrieved from the Internet: <http://worldwide.espacenet.com/publicationDetails/biblio?DB=worldwide.espacenet.com&II=0&ND=3&adjacent=true&locale=en_EP&FT=D&date=20061129&CC=CN&NR=2842587Y&KC=Y>.

International Search Report & WO, PCT/US2009/062634, Jul. 14, 2010.

IPRP, PCT/US2009/062634, May 10, 2012.

Office Action, CN Application No, 200980162179.8, Date: Jan. 21, 2015, pp. 1-5.

* cited by examiner

NETWORK SWITCH CONNECTED TO A SENSOR

CROSS-REFERENCE TO RELATED APPLICATION

This application is a national stage application under 35 U.S.C. §371 of PCT/US2009/062634, filed Oct. 29, 2009.

BACKGROUND

Many organizations own and operate computer equipment that function to run the organization's systems such as accounting, human resources, etc. The equipment itself may comprise servers, switches, storage devices, etc. The information stored and processed by such equipment is often highly confidential. Access to such equipment should be, but is not always, tightly controlled. An intruder gaining physical access to the equipment may be able to obtain confidential information from the equipment, or infect the system with a virus or other harmful code.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
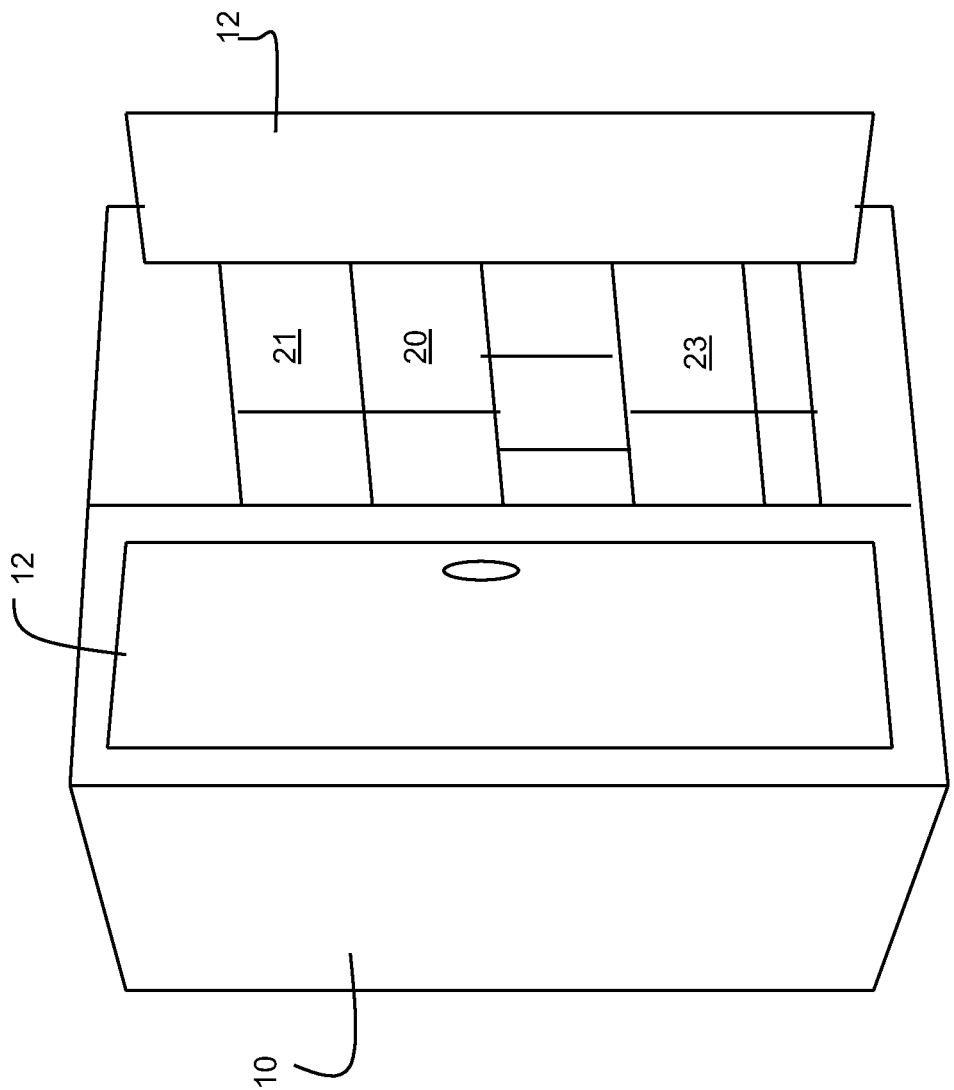
FIG. 1 shows an equipment rack in accordance with an embodiment of the invention.

FIG. 1 shows an embodiment of an equipment rack 10. The equipment rack 10 comprises a support structure constructed of, for example, metal, that supports and houses one or more computing devices. Examples of such computing devices that can be housed within the equipment rack 10 include network switches, computers (e.g., servers) 21, storage devices 23, etc. In the embodiment of FIG. 1, the equipment rack 10 is generally rectangular (although other shapes are possible) and includes one or more movable access mechanisms 12. In the embodiment of FIG. 1, each movable access mechanism 12 comprises a door and will be described below as a movable access door. Two movable access doors 12 are shown in FIG. 1, but any number, one or more, are possible as well. Each movable access door 12 moves to allow a person to gain access to the interior of the rack and thus the equipment contained in the rack. In FIG. 1, each door 12 pivots about a hinge from a closed position to an open position. In other embodiments, each movable access door slides instead of pivots.

Figure 2:
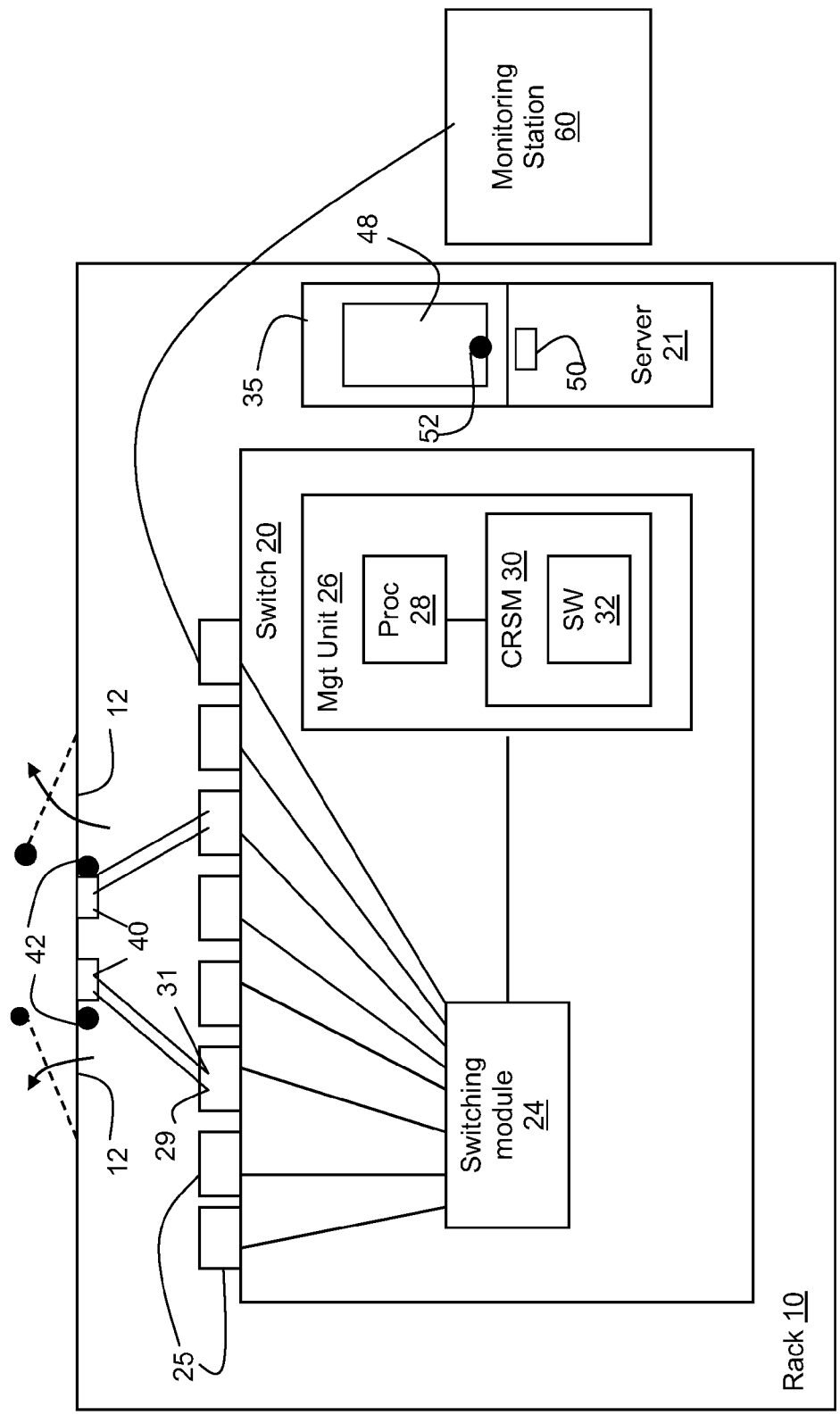
FIG. 2 shows a system diagram in which one or more sensors are connected to a network switch in accordance with various embodiments.

FIG. 2 shows a system diagram of one of the network switches 20 and a server 21 contained within the rack 10. Other equipment may also be provided in the rack as depicted in FIG. 1, but is not shown in FIG. 2. The network switch 20 comprises multiple switch ports 25 to which server 21, and other servers and/or other computing devices can be connected. The switch ports 25 are coupled to a switching module 24 in the switch 20. The switching module 24 receives a packet of data from a computing device (e.g., server 21) via one of its ports 25 and uses, for example, a routing or forwarding table, to determine through which other port 25 that packet should be routed. The switching module 24 then transmits the packet out through the appropriate switch port 25.

The switch 20 may also comprise a management unit 26 coupled to the switching module 24. The management unit 26 comprises a processor 28 coupled to a computer-readable storage medium (CRSM) 30. The CRSM 30 comprises volatile memory and/or non-volatile storage. The CRSM 30 contains software 32 that is executable by processor 28 to provide the switch 20 with some or all of the functionality attributed to it as described herein.

In accordance with various embodiments, the rack includes a sensor 40 that detects when one or more of the movable access doors 12 is moved, for example, from the closed position to an open position. Each movable access door 12 may comprise or be associated with a separate sensor 40, as shown in FIG. 1. In other embodiments, the rack 10 may have a single sensor 40 for both doors 12 to detect when either door has been opened.

In some embodiments, the sensor 40 is mounted on the rack near to where an edge of the movable access door 12 is located when in the closed position. The sensor 40 may comprise a magnetic switch in some embodiments. A corresponding magnet 42 is mounted on or near an edge of the movable access door 12. When the door 12 is in a shut (closed) position, the magnet 42 is near enough to the magnetic switch to cause the magnetic switch to be in a predetermined state such as a closed state (electrically conductive). When the door 12 is opened, the magnet, which is mounted on the door, moves away from the magnetic switch 50 thereby causing the magnetic switch to change state to, for example, an open state (non-conductive). Thus, the magnetic switch (sensor 40) is either closed (conductive) or open (non-conductive) depending on whether the door 12 itself is closed or open.

In other embodiments, the sensor 40 may be other than a magnetic switch. Another example of the sensor 40 includes a mechanically-actuated sensor. In other embodiments, the sensor may comprise a photo diode or other light sensitive device.

Each sensor 40 is wired to a switch port 25 in accordance with some embodiments. Each switch port 25 comprises multiple conductors including, for example, a transmit conductor 29 and a receive conductor 31. In some embodiments, the conductors comprise conductive pins in a connector of the switch port. Each sensor 40 is wired to the transmit and receive conductors 29, 31 of a switch port 25. Each of the sensors 40 provided on or near an exterior portion of the rack 10 is physically wired to a separate switch port 25, and specifically to the transmit and receive conductors 29, 31 of such switch ports in some embodiments.

In accordance with various embodiments, the switch 20 is able to detect whether any of its communication links from its ports are operational or have failed. When a device (e.g., a server 21) is connected via a cable to one of the switch's ports 25, the switch 20 (e.g., the management unit 26) engages in an auto-negotiation process to determine the bit rate (speed) and type of duplex (e.g., half duplex, full duplex) that such device and the switch 20 are to implement when communicating over that particular link. For example, in accordance with the auto-negotiation process defined by IEEE 802.3ab, a series of pulses are transmitted by the switch over the transmit conductor. The series of pulses encodes the technology abilities of the switch such as whether the switch supports 10BASE-T, 10BASE-T in full duplex, 100BASE-TX, 100BASE-TX in full duplex, 100BASE-T4, pause, asymmetric pause for full duplex, etc. The corresponding device (e.g., server) receives and decodes the series of bits to determine the capabilities of the switch. The device also broadcasts a series of pulse via its own transmit conductor to the switch, which is received on the switch's receive conductor. In this way, the switch and the device inform each other of their own capabilities so that a suitable capability can be selected for that particular communication link.

By connecting a sensor 40 to the transmit and receive conductors of a particular switch port 25, such transmit and receive conductors effectively are short-circuited by the sensor when the movable access door 12 is in its closed state. Thus, when the switch 20 engages in the auto-negotiation process, the series of bits transmitted by the switch out its transmit conductor 29 are looped back through the sensor 40 to the switch's receive conductor 31 of the same port 25. The switch's auto-negotiation process is unable to distinguish such a loop configuration (i.e., transmit conductor shorted through a sensor 40 to the receive conductor) in which the switch's technology capabilities are looped back on itself from an actual device (e.g., server) being connected to the port and transmitting its technology capabilities to the switch. Accordingly, the switch 20 determines that the communication link is operational (status is "good," also called "link up") even though the switch port 25 is only connected to a passive sensor 40.

The switch 20 also includes the capability of detecting when a link becomes non-operational (also called "link down"). For example, the switch 20 expects normal link pulses (NLP) which are sent by a connected device (e.g., server 21) when that device is not otherwise sending any data packets. The switch 20 detects a failure of a link (which can be due either to a failure of the transmission medium or the other device) if neither a packet of data nor one of the normal link pulses is received for a predetermined time period (e.g., 50 milliseconds).

The switch 20 has no packets of data to transmit through a port 25 connected to a sensor 40. The switch, however, will transmit the normal link pulses as described above through the port's transmit conductor 29. Such pulses are looped back through the sensor 40 to the port's receive conductor 31. The switch thus believes the link is operational (link up). However, if the movable access door 12 is opened (as indicated by the dashed line representation of the doors 12 in FIG. 2), the magnet 42 moves away from the corresponding sensor 40 thereby causing the sensor to change state to the open state. As a result of the sensor being in an open (i.e., non-conductive) state, the short-circuit condition is broken between the port's transmit and receive conductors 29, 31. Consequently, the normal link pulses transmitted via the transmit conductor 29 will discontinue being received on that port's receive conductor. After the expiration of the predetermined time period (e.g., 50 milliseconds) following the last received normal link pulse, the management unit 26 of the switch 20 declares that particular port to have a failed link (link down). The management unit 26 responds to this detected condition by sending a status message to a monitoring station 60 which may be in the same rack 10 or located outside the rack. In accordance with various embodiments, the status message may be formed and transmitted in accordance with the Simple Network Management Protocol (SNMP) or other suitable protocol. The status message contains information that indicates that one of the switch's links has failed.

The management station 60 may be programmed as to which port(s) 25 on the switch 20 are connected to a sensor 40. When the management station 60 receives a status message from the switch that a link associated with that particular port has failed, the management station 60 reports that the movable access door has been opened, which may be indicative of the presence of an intruder. In some embodiments, once a technician connects a sensor 40 to a particular port 25, the technician or someone else programs the management station 60 as to which ports 25 have been connected to sensors. Further, the management station 60 may report the possible intruder by generating a visual alert, audible alert, sending a text message to appropriate personnel, sending an email, etc.

FIG. 2 also illustrates a server 21 being connected to one of the switch's ports 25. The sever 21 comprises a chassis 35 having a movable access mechanism 48 which may comprise a cover. The access cover 48 can be slid out of the way, or removed, to provide access to the interior components of the server. A sensor 50 can be provided on the server's chassis 35 at or near the movable access cover 48. This sensor 50 also may comprise a magnetic switch and the cover may include the corresponding magnet 52. In general, the sensor 50 can comprise any of the types of sensors described herein.

The ports 25 of the switch 20 can be connected to sensors that are on or in the same rack as the switch, or in a different rack. For example, the server 21 shown in FIG. 2 is in the same rack 10 as the switch 20 to which sensor 50 is connected, but the server 21 could just as well be located outside rack 10 such as in a different rack.

In accordance with various embodiments, a switch port 25 to which a sensor 40, 50 is connected is isolated from the other ports. In some such embodiments, a port connected to a sensor is configured as a single port virtual local area network (VLAN). By isolating the port, any data transmitted by the port and looped back on itself via the sensor will not be transmitted to any other ports.

Sensors on equipment other than rack doors and computing device access covers can be connected to a switch port 25 as well. For example, a sensor coupled to a window, a light switch, a telephone handset, and/or fire alarm switch also could be connected to a network switch port 25. The sensor could also comprise a motion sensor.

Figure 3:
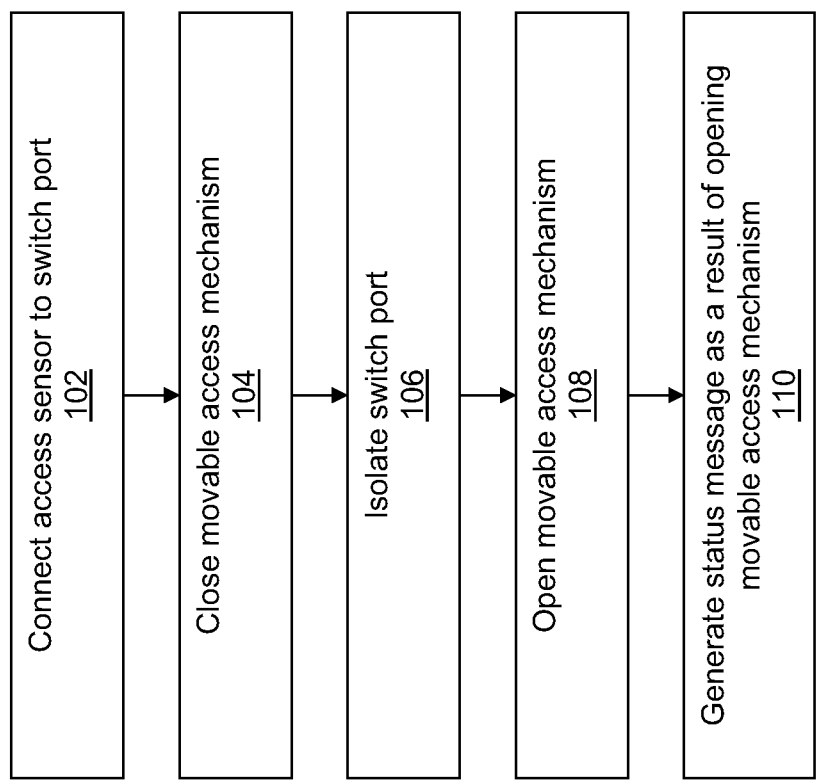
FIG. 3 shows a method in accordance with various embodiments.

FIG. 3 provides a method in accordance with various embodiments. The actions depicted in FIG. 3 can be performed in the order shown, or in a different order. Further, some of the actions can be performed in parallel instead of serially.

At 102, a sensor 40 is connected to a switch port 25. At 104, a movable access door is closed. At 106, the switch port to which the sensor is connected is isolated. At 108 the movable access door is opened, and at 110 the switch 20 generates a status message as a result of the opening of the movable access door.

In some embodiments, the sensor connected to the switch port 25 provides a signal to the switch port indicative of a count of a particular activity. The sensor could assert a signal to the switch port and the switch or monitoring station 60 could count the number of times that signal is asserted. For example, the monitoring station 60 could count the number of times a light switch is turned on and off, or the number of times the light switch is left on over night.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a rack;
   a network switch contained in said rack, said switch comprising a plurality of switch ports;
   a moveable access mechanism in said rack; and
   a sensor on said rack that is electrically connected to a switch port on said network switch, said sensor detecting when said movable access mechanism is moved,
   wherein the switch determines whether the movable access mechanism is moved based on a presence or absence of encoded link pulses transmitted between the switch port and the sensor,
   wherein, when the moveable access mechanism is in a first position, the encoded link pulses are transmitted from the switch port to the sensor and are looped back through the sensor to the switch port.

2. The system of claim 1 wherein said sensor comprises a magnetic switch.

3. The system of claim 1 wherein said sensor comprises a plurality of electrical contacts, and at least one electrical contact is provided on said movable access mechanism.

4. The system of claim 1 wherein said switch port to which said sensor is electrically connected comprises a transmit pin and a receive pin, and wherein said transmit pin and said receive pin are connected to said sensor such that, with the movable access mechanism in a closed position, said transmit pin is short-circuited to said receive pin.

5. The system of claim 4 wherein, upon opening said movable access mechanism, said switch detects a change in link status and automatically transmits a status message via one of its ports.

6. The system of claim 1 wherein said switch port to which said sensor is electrically connected is configured as a virtual local area network comprising only that particular switch port.

7. The system of claim 1, wherein:
   the switch port comprises a transmit conductor and a receive conductor;
   when the moveable access mechanism is in the first position, the encoded link pulses are transmitted by the transmit conductor and are looped back through the sensor to the receive conductor; and
   when the moveable access mechanism is in a second position, the receive conductor does not receive the encoded link pulses.

8. The system of claim 1, further comprising:
   a monitoring station that collects data relating to the presence or absence of the encoded link pulses transmitted between the switch port and the sensor and determines a number of times that the switch detects the absence of the encoded link pulses transmitted between the switch port and the sensor.

9. The system of claim 1, further comprising:
   a management station that determines whether the moveable access mechanism is moved based on whether a link associated with the switch port has failed.

10. The system of claim 1, wherein data transmitted by the switch port is looped back on the switch port via the sensor without being transmitted to any other switch port of the plurality of switch ports.

11. The system of claim 1, wherein the sensor is directly connected to the switch port.

12. A system, comprising:
    a rack;
    a network switch contained in said rack, said switch comprising a plurality of switch ports;
    a computing device provided in said rack and comprising an access mechanism;
    a sensor associated with said access mechanism, said sensor being electrically connected to a switch port on said network switch, said sensor detecting when said access mechanism is opened,
    wherein the network switch determines whether the access mechanism is moved based on a presence or absence of encoded link pulses transmitted between the switch port and the sensor,
    wherein, when the access mechanism is in a first position, the encoded link pulses are transmitted from the switch port to the sensor and are looped back through the sensor to the switch port.

13. The system of claim 12 wherein said sensor comprises a plurality of electrical contacts, and at least one electrical contact is provided on said access mechanism.

14. The system of claim 12 wherein said switch port to which said sensor is electrically connected comprises a transmit pin and a receive pin, and wherein said transmit pin and said receive pin are connected to said sensor such that, with the access mechanism in a closed position, said transmit pin is short-circuited to said receive pin.

15. The system of claim 14 wherein, upon opening said access mechanism, said switch detects a change in link status and automatically transmits a status message via one of its ports.

16. The system of claim 12 wherein the encoded link pulses are encoded according to a communication protocol associated with the network switch.

17. A method, comprising:
    connecting a sensor to a switch port;
    closing a moveable access mechanism, said sensor detecting movement of said moveable access mechanism;
    isolating said switch port;
    opening said movable access mechanism; and
    as a result of opening said movable access mechanism, generating a status message,
    wherein, when the moveable access mechanism is in a closed position, a series of encoded link pulses are transmitted from the switch port to the sensor and are looped back through the sensor to the switch port.

18. The method of claim 17, wherein isolating said switch port comprises forming a virtual local area network comprising only said switch port.

19. The method of claim 17, wherein connecting the sensor to said switch port comprises short-circuiting transmit and receive signals of said switch port.

20. The method of claim 17, wherein isolating said switch port comprises configuring the switch port as a single port virtual local area network.

* * * * *